US011922785B2

(12) United States Patent
Johansen

(10) Patent No.: US 11,922,785 B2
(45) Date of Patent: Mar. 5, 2024

(54) NIGHT SECURITY ALARM SYSTEM

(71) Applicant: AVARA AS, Sandefjord (NO)

(72) Inventor: Rudy Steen Johansen, Stavern (NO)

(73) Assignee: AVARA AS, Sandefjord (NO)

(*) Notice: Subject to any disclaimer, the term of this patent is extended or adjusted under 35 U.S.C. 154(b) by 0 days.

(21) Appl. No.: 17/913,719

(22) PCT Filed: Mar. 17, 2021

(86) PCT No.: PCT/EP2021/056835
§ 371 (c)(1),
(2) Date: Sep. 22, 2022

(87) PCT Pub. No.: WO2021/191025
PCT Pub. Date: Sep. 30, 2021

(65) Prior Publication Data

US 2023/0110176 A1 Apr. 13, 2023

(30) Foreign Application Priority Data

Mar. 23, 2020 (SE) .................................... 2050316-5

(51) Int. Cl.
*G08B 13/19* (2006.01)
*G08B 25/00* (2006.01)

(52) U.S. Cl.
CPC ........... *G08B 13/19* (2013.01); *G08B 25/008* (2013.01)

(58) Field of Classification Search
CPC .............................. G08B 13/19; G08B 25/008
See application file for complete search history.

(56) References Cited

U.S. PATENT DOCUMENTS

| | | | |
|---|---|---|---|
| 10,352,734 B2 | 7/2019 | Ricks et al. | |
| 2006/0267780 A1 | 11/2006 | Adams | |
| 2008/0157964 A1 | 7/2008 | Eskildsen et al. | |
| 2009/0051528 A1 | 2/2009 | Graichen | |

(Continued)

FOREIGN PATENT DOCUMENTS

| | | | |
|---|---|---|---|
| EP | 2929517 A2 | 10/2015 | |
| KR | 20200046987 | * 10/2018 | ............. B60N 2/002 |

(Continued)

OTHER PUBLICATIONS

Search Report dated Sep. 18, 2020, by the Swedish Patent and Registration Office in Swedish Patent Application No. 2050316-5, (3 pages).

(Continued)

*Primary Examiner* — Hongmin Fan
(74) *Attorney, Agent, or Firm* — BUCHANAN, INGERSOLL & ROONEY PC

(57) ABSTRACT

A night security alarm system for a home, such as a recreational vehicle or a caravan, which night security alarm system includes: a first detector adapted to detect movement inside the home; a second detector adapted to detect opening of a door connecting the inside and the outside of the home; a third detector adapted to detect movement outside the home; and a control unit configured to automatically deactivate the night security alarm system if the first detector detects movement inside the home and then the second detector detects opening of the door and then the third detector detects movement outside the home.

9 Claims, 6 Drawing Sheets

(56) References Cited

U.S. PATENT DOCUMENTS

| | | | | |
|---|---|---|---|---|
| 2016/0189526 | A1* | 6/2016 | Kennedy .............. | G08B 25/008<br>340/541 |
| 2016/0189527 | A1* | 6/2016 | Peterson ................ | G08B 31/00<br>340/541 |
| 2017/0316680 | A1 | 11/2017 | Lamb et al. | |
| 2018/0154908 | A1* | 6/2018 | Chen ................. | B60W 50/0097 |
| 2019/0041822 | A1 | 2/2019 | Burke et al. | |

FOREIGN PATENT DOCUMENTS

| | | | |
|---|---|---|---|
| KR | 101971205 | B1 | 4/2019 |
| WO | 2014091073 | A2 | 6/2014 |
| WO | 2015046784 | A1 | 4/2015 |
| WO | 2016109335 | A1 | 7/2016 |

OTHER PUBLICATIONS

International Preliminary Report on Patentability (PCT/IPEA/409) issued in corresponding International Patent Application No. PCT/EP2021/056835 dated Sep. 13, 2022. (15 pages).

International Search Report (PCT/ISA/210) and Written Opinion (PCT/ISA/237) dated Jun. 22, 2021, by the European Patent Office as the International Searching Authority for International Application No. PCT/EP2021/056835. (10 pages).

* cited by examiner

NIGHT SECURITY ALARM SYSTEM

TECHNICAL FIELD

The present invention relates to a night security alarm system for a home, such as a recreational vehicle or a caravan. The present invention also relates to a corresponding method, and to a recreational vehicle or caravan comprising such a night security alarm system. The present invention also relates to a computer program product, a computer-readable storage medium, and an electrical signal.

BACKGROUND

Night security alarm systems for recreational vehicles or caravans are used at night when the inhabitant(s) of the recreational vehicle or caravan sleep(s). The night security alarm system may aim to prevent burglary and to protect the inhabitant(s) against intruders by detecting movement outside the recreational vehicle or caravan and/or by detecting opening of a door to the recreational vehicle or caravan. An alarm issued by the night security alarm systems could for example be a sound, light that lights up the outside of the recreational vehicle or caravan, and/or transmission of an alarm signal to an alarm centre.

However, a problem with existing night security alarm systems for recreational vehicles or caravans is that they may issue false alarms.

Concerning false alarms in security systems, US2017316680 discloses a method performed by a central security monitoring device for reducing incidences of false alarms in a security system, comprising: receiving an alarm signal from an occupancy sensor via a receiver; receiving a second alarm signal from a barrier alarm device (a door or a window sensor) after receiving the alarm signal; determining, by a processor, an elapsed time from when the alarm signal from the occupancy sensor was received to when the second alarm signal from the barrier alarm device was received; and transmitting, by the processor via a network interface, a message to a personal communication device indicating that a false alarm has occurred when the elapsed time is less than the predetermined time.

Furthermore, US2008157964 discloses a system and method for securing a structure, such as a residence or other building, against intrusion, while reducing generation of false alarms when an occupant of the structure inadvertently trips a contact detector by opening an entry point (door, window, etc.) is provided. The contact detector is coupled with a motion detector that is directed to monitor motion within the structure at a location proximate to the entry point being monitored by the contact detector. Generally, when the contact detector detects that the entry point is being opened, a fault is issued to a control panel, which in turn generates an alarm. However, if motion is detected within the structure and proximate to the entry point prior to the contact detector registering an opening of the entry point, no fault is generated.

However, none of US2017316680 and US2008157964 solves the problem with false alarms in night security alarm systems that detect movement outside a recreational vehicle or caravan.

SUMMARY OF THE INVENTION

It is an object of the present invention to overcome or at least alleviate the aforementioned problem(s), and to provide an improved night security alarm system and method, which in particular can reduce false alarms.

According to a first aspect of the present invention, this and other objects is achieved by a night security alarm system for a home, such as a recreational vehicle or a caravan, which night security alarm system comprises: a first detector adapted to detect movement inside the home; a second detector adapted to detect opening of a door connecting the inside and the outside of the home; a third detector adapted to detect movement outside the home; and a control unit configured to automatically deactivate (disarm) the night security alarm system if the first detector detects movement inside the home and then the second detector detects opening of the door and then the third detector detects movement outside the home.

In other words, the control unit automatically disarms (deactivates) the night security alarm system when a) detection of movement inside the home, b) detection of the door opening, and c) detection of movement outside the home occur in (that) sequence, i.e. a)-c), whereby no alarm is issued despite that movement is detected outside the home by the third detector.

A frequent source of false alarms in night security alarm systems for recreational vehicles or caravans is that the inhabitant forgets to deactivate or disarm the night security alarm system when they open the door and walks outside. This typically occurs in the morning, and then the night security alarm system should anyways not be activated (armed).

The present night security alarm system is therefore provided with functionality that automatically deactivates the night security alarm system by recognizing—using (at least) three different detectors—a pattern that characterizes the inhabitant waking up and going outside in the morning. The three different detectors are the first detector adapted to detect movement inside the home, second detector adapted to detect opening of the door, and the third detector adapted to detect movement outside the home. When the inhabitant wakes up and goes outside in the morning, first the first detector detects the inhabitant moving inside the home, then the second detector detects that the door is opened (by the inhabitant), and then the third detector detects the inhabitant moving outside the home. To this end, the control unit of the night security alarm system is configured to automatically deactivate the night security alarm system if the first detector detects movement inside the home and then the second detector detects opening of the door and then the third detector detects movement outside the home. Hence, no alarm will be issued even if the inhabitant forgets to manually deactivate the night security alarm system before they go out in the morning, whereby the number of false alarms may be reduced.

In case of burglary when the inhabitant is sleeping in the home, the above-mentioned sequence will not be present, but rather the opposite sequence, i.e. c)-a), whereby an alarm indeed will be issued.

The control unit may be configured to set a first status “movement inside” while the first detector detects movement inside the home, to set a second status “opening door” while the second detector detects opening of the door, and to set a third status “outgoing sequence initiated” while both the first and second statuses “movement inside” and “opening door” are set. Specifically, the control unit may be configured to set the third status “outgoing sequence initiated” while both the first and second statuses “movement inside” and “opening door” are set (only) if the first status "movement inside" is set before the second status "opening door" is set, to mimic movement of the inhabitant in the morning in even more detail.

That the control unit sets a third status "outgoing sequence initiated" while both the first and second statuses "movement inside" and "opening door" are set means that the third status "outgoing sequence initiated" is set or present or valid during the time there is detected movement inside and detected opening of the door. However, the control unit is preferably configured to maintain the third status "outgoing sequence initiated" (once it has been set) while the second status "opening door" is set, even if the first status "movement inside" is unset. On the other hand, the control unit may unset (reset) the third status "outgoing sequence initiated" when the second status "opening door" is unset, if for example the inhabitant goes back inside instead of going outside. This may ensure that the night security alarm system is not automatically deactivated by mistake.

The control unit may further be configured to automatically deactivate the night security alarm system when the third detector detects movement outside the home while the third status "outgoing sequence initiated" is set.

On the other hand, the control unit may be configured to issue an alarm if the second detector detects opening of the door and/or the third detector detects movement outside the home while the third status "outgoing sequence initiated" is not set.

The second detector may be a PIR-based (PIR=passive infrared) detector adapted to detect opening of the door by detecting a person in or near the doorway of the door, preferably (only) when the door is opened from the outside of the home. The latter may be achieved by placing the second sensor so that it does not see the person opening the door from the inside. An advantage of this is that the door could be (slightly) opened from the inside without the second detector detecting that it is opened, for example if the inhabitant of the home wants to get some air in or wants to check that the door is properly closed, whereby the above-mentioned sequence that deactivates the night security alarm system will not occur even if the third detector subsequently detects movement outside the home. It should be noted that despite this, if the inhabitant opens the door from the inside and thereafter walks outside, the second detector will indeed detect opening of the door, so that the night security alarm system can be deactivated as discussed above. It should further be noted that even if the second detector detects opening of the door when it is just slightly opened from the inside by the inhabitant not going outside, the aforementioned third status "outgoing sequence initiated" will be unset when the inhabitant goes back inside and away from the door, whereby an alarm will be issued if the third detector subsequently detects movement outside the home. The second detector could alternatively be a magnetic detector or a vibration detector, for example.

The third detector may be adapted to selectively detect movement in a proximal zone and a distal zone outside the home, wherein the control unit is configured to automatically deactivate the night security alarm system if the first detector detects movement inside the home and then the second detector detects opening of the door and then the third detector detects movement first in the proximal zone and then in the distal zone outside the home (but not if the third detector detects movement first in the distal zone and then in the proximal zone). This mimics movement of the inhabitant in the morning in even more detail, to make sure that the night security alarm system is correctly deactivated.

The first and third detectors may (also) be PIR-based motion detectors, for example.

According to a second aspect of the present invention, there is provided a recreational vehicle or caravan comprising a night security alarm system according to the first aspect.

According to a third aspect of the present invention, there is provided a method of operation of a night security alarm system of a home, such as a recreational vehicle or a caravan, which method comprises: detecting, by a first detector of the night security alarm system, movement inside the home; detecting, by a second detector of the night security alarm system, opening of a door connecting the inside and the outside of the home; detecting, by a third detector of the night alarm system, movement outside the home; and by a control unit of the night security alarm system, automatically deactivating the night security alarm system if movement inside the home is detected and then opening of the door is detected and then movement outside the home is detected. This aspect may have the same or similar features and/or technical effects as the first and/or second aspect, and vice versa.

According to a fourth aspect of the present invention, there is provided a computer program product comprising computer program code to perform, when executed on a computer, the step(s) of: automatically deactivating a night security alarm system for a home if movement inside the home is detected by a first detector and then opening of a door connecting the inside and the outside of the home is detected by a second detector and then movement outside the home is detected by a third detector. This aspect may have the same or similar features and/or technical effects as one or more of the previous aspects, and vice versa. The computer program product may be a non-transitory computer program product. The computer may for example be the aforementioned control unit. The computer program product may be provided as a software upgrade to the control unit of an existing night security alarm system.

According to a fifth aspect of the present invention, there is provided a computer-readable storage medium comprising the computer program product according to the fourth aspect.

According to a sixth aspect of the present invention, there is provided an electrical signal embodied on a carrier wave and propagated on an electrical medium, the electrical signal comprising the computer program product according to the fourth aspect.

BRIEF DESCRIPTION OF THE DRAWINGS

These and other aspects of the present invention will now be described in more detail, with reference to the appended drawings showing currently preferred embodiments of the invention.

DETAILED DESCRIPTION

Figure 1:
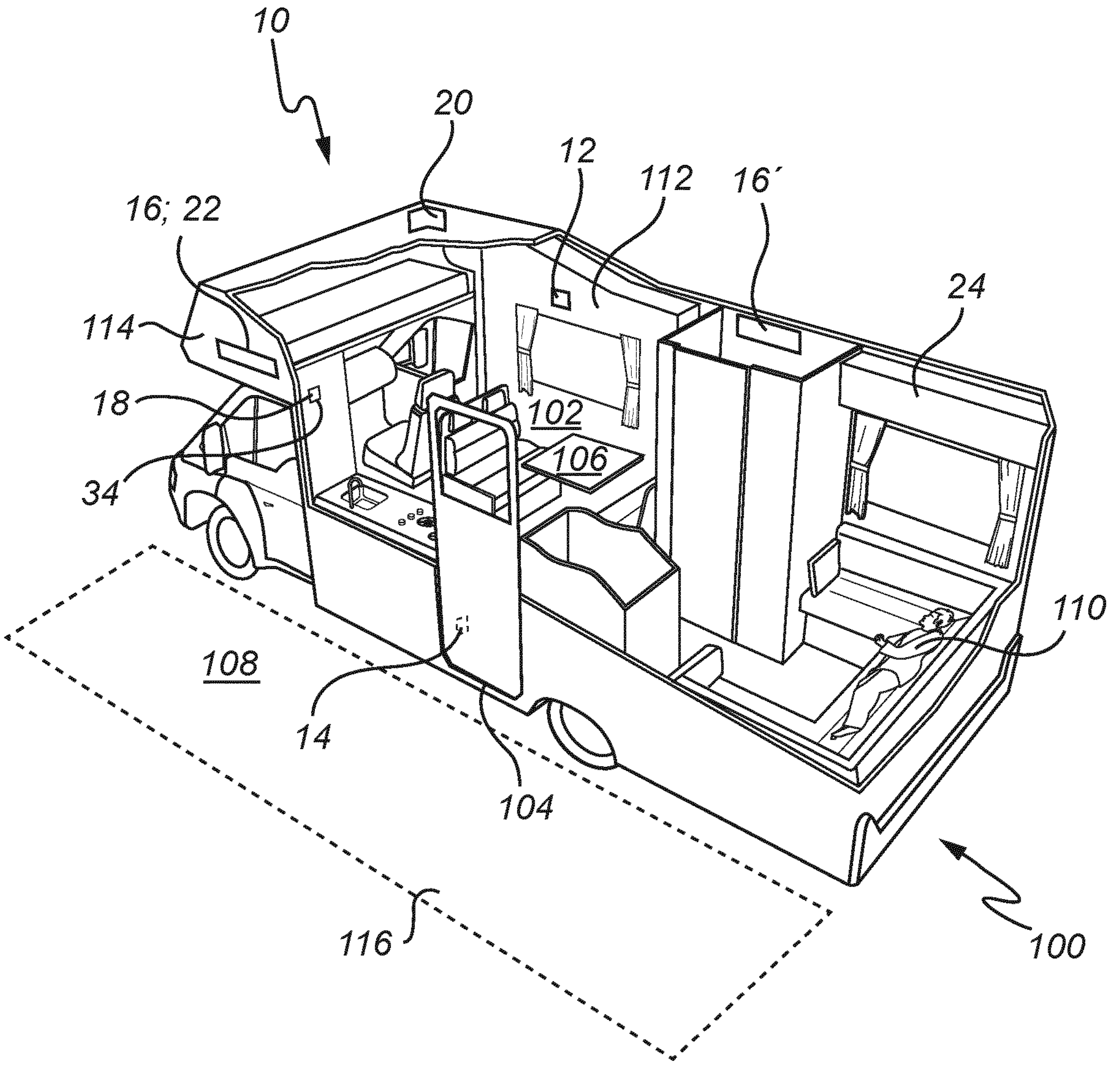
FIG. 1 illustrates a night security alarm system of a recreational vehicle according to an embodiment of the present invention.
Figure 2:
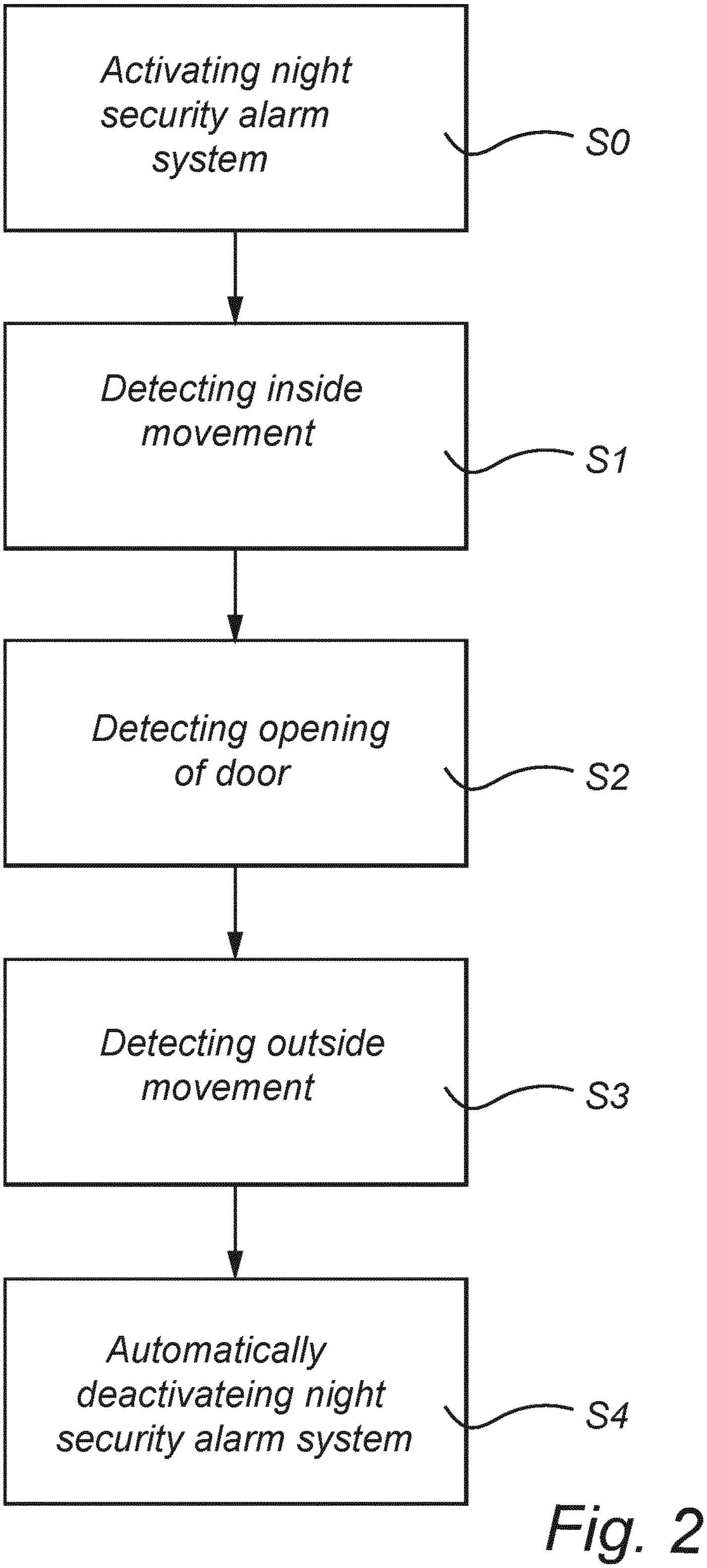
FIG. 2 is a flow chart of a method according to an embodiment of the present invention.

FIG. 1 illustrates a night security alarm system 10 according to an embodiment of the present invention.

The night security alarm system 10 is in FIG. 1 installed in a home 100, namely in a recreational vehicle (motorhome). The home (recreational vehicle/motorhome) 100 includes living quarters 102 and a door 104 connecting the inside 106 and the outside 108 of the home 100. The door 104 may be an entrance door. The night security alarm system 10 could alternatively be installed in a caravan or in a mobile home or in a house, for example.

The night security alarm system 10 is to be used (activated/armed) at night when an inhabitant 110 of the home 100 sleeps inside the home 100. The night security alarm system 10 generally aims to prevent burglary and protect the inhabitant 110 against one or more intruders by detecting movement outside 108 the home 100 and/or opening of the door 104.

The night security alarm system 10 comprises a first detector 12 adapted to detect movement inside the home 100, i.e. at 106. The first detector 12 may for example be a PIR-based motion detector. The first detector 12 may be mounted on an inside wall 112 of the home 100.

The night security alarm system 10 further comprises a second detector 14 adapted to detect opening of the door 104. The second detector 14 may be a PIR-based detector adapted to detect opening of the door 104 by detecting a person in or near the doorway 118 of the door 104 (see FIG. 3*b*), preferably when the door 104 is opened from the outside. To this end, the (PIR-based) second detector 14 may be mounted inside the home 100, near the door 104 and doorway 118, but aimed towards the outside, so that it typically does not see a person (=the inhabitant 110) opening the door 104 from the inside, unless that person subsequently walks outside.

The night security alarm system 10 further comprises a third detector 16 adapted to detect movement outside the home 100, i.e. at 108. The third detector 16 may be a PIR-based motion detector. The third detector 16 may be mounted on an exterior wall 114 of the home 100. The third detector 16 could alternatively be mounted off the home 100, for example on a stand. The third detector 16 may specifically be adapted to detect movement in an area 116 in front of the door 104. Another third detector 16' may be adapted to detect movement in another area on the opposite side of the home 100.

The first detector 12, the second detector 14, and the third detector 16 may be arranged such that a person (e.g. the inhabitant 102) moving from the inside 106 via the door 104 to the outside 108 of the home 100, or vice versa, typically is detected simultaneously by two or three of the detectors 12-16 at a given time.

The night security alarm system 10 further comprises a control unit 18.

The control unit 18 may comprise a computer with a processor and a memory. The control unit 18 may be mounted inside the home 100, typically near the door 104. The control unit 18 may be connected to the first detector 12, the second detector 14, and the third detector 16 (and 16'), through wired connection or wireless connection. The control unit 18 may further comprises input means (e.g. buttons and/or a touch screen) for manual control of the night security alarm system 10 by the inhabitant 110, such as activation (arming) of the night security alarm system 10 before the inhabitant 110 goes to bed at night and/or deactivation night security alarm system 10 in the morning.

The control unit 18 is generally configured to issue an alarm when the night security alarm system 10 is activated/armed and the third detector 16 (or 16') detects movement outside the home 100, for example by an intruder moving in the area 116, and/or when the second detector 14 detects opening of the door 104, for example by an intruder having somehow avoided the third detector 16.

The alarm issued by the night security alarm system 10 could for example be a sound sounded by an exterior siren 20, light emitted by a lamp 22 that lights up the outside 108 of the home 110, and/or transmission of an alarm signal to for example an alarm centre (not shown) via a modem 24. The modem 24 may be a mobile broadband modem (wireless modem). The exterior siren 20, the lamp 22, and/or the modem 24 may be included in the night security alarm system 10. The exterior siren 20, the lamp 22, and/or the modem 24 may be connected to the control unit 18, through wired connection or wireless connection.

However, in order to prevent false alarms, the control unit 18 may specifically be configured (by hardware and/or software 34) to refrain from issuing an alarm and to automatically deactivate (disarm) the night security alarm system 10 if a) the first detector 12 detects movement inside the home 100 and b) then the second detector 14 detects opening of the door 104 and c) then the third detector 16 detects movement outside the home 100.

This sequence a)-c) corresponds to the inhabitant 110 waking up and going to the outside 108 in the morning, as will be further explained with reference to FIGS. 2 and 3*a*-*c* and 4*a*. The flow chart of FIG. 2 may correspond to operation of the night security alarm system 10.

At S0, the night security alarm system 10 is activated (armed), typically manually by the inhabitant 110 using the input means of the control unit.

Figure 3A:
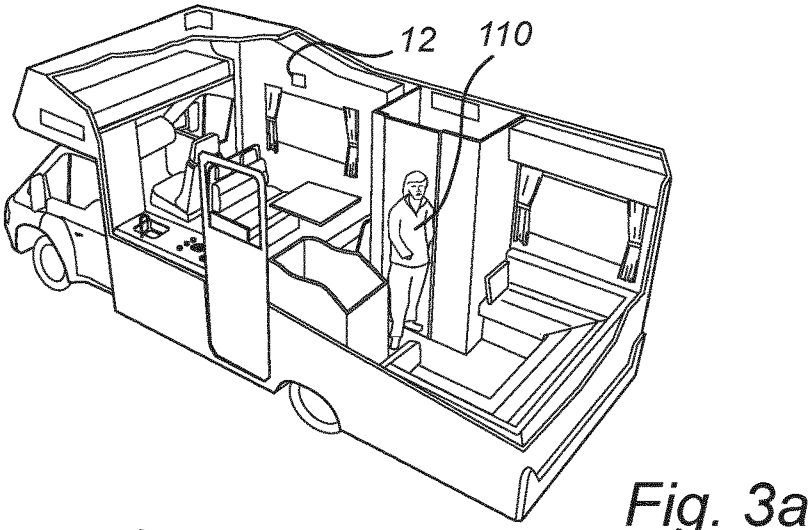
FIGS. 3*a-c* illustrate an inhabitant of the recreational vehicle waking up and going outside in the morning.

At S1, the first detector 12 detects movement inside the home 100, as the inhabitant 110 wakes up, gets out of bed, and/or starts moving around inside the home 100 (FIG. 3*a*).

Figure 3B:
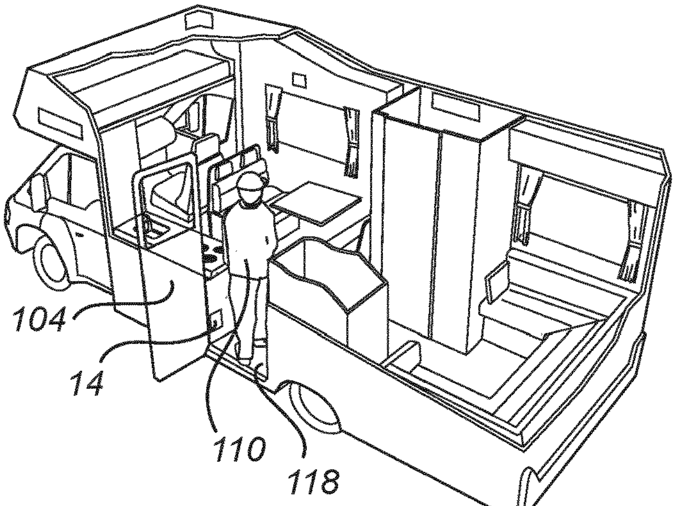

Next at S2, the second detector 14 detects opening of the door 104 by the inhabitant 110 (FIG. 3*b*).

Figure 3C:
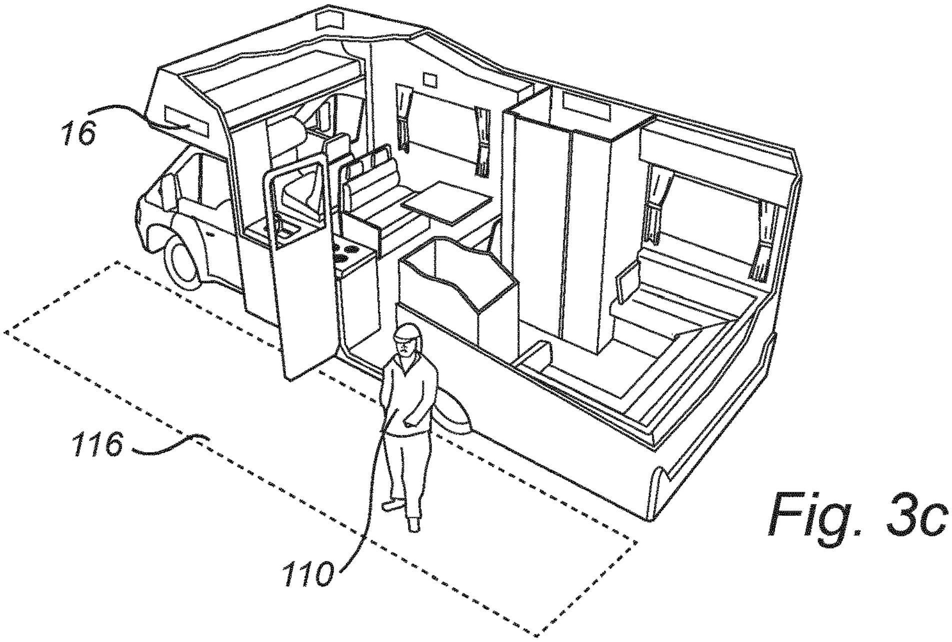

Next at S3, the third detector 16 detects movement by the inhabitant 110 outside the home 100 (FIG. 3*c*).

Figure 4A:
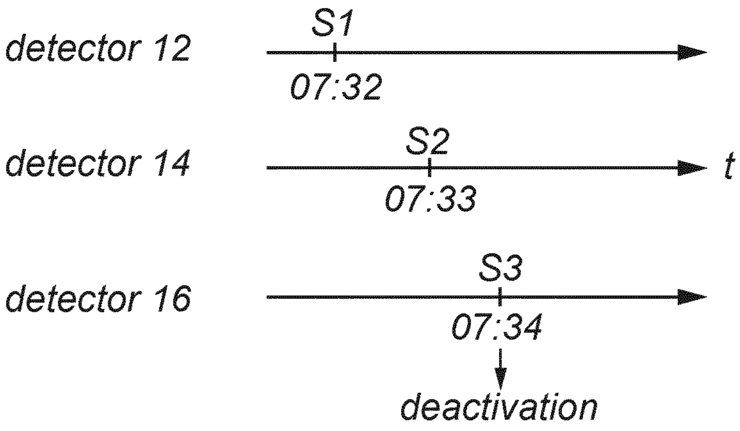
FIGS. 4*a-f* illustrate time lines of exemplary scenarios that lead to deactivation or alarm.

At S4, following the sequence S1-S3, the control unit 18 automatically deactivates the night security alarm system 10, see FIG. 4*a*. Hence, no alarm will be issued, even if the inhabitant 110 forgets to manually deactivate the night security alarm system 10 before going out in the morning and despite that movement is detected outside the home by the third detector 16, whereby the number of false alarms may be reduced.

Figure 4B:
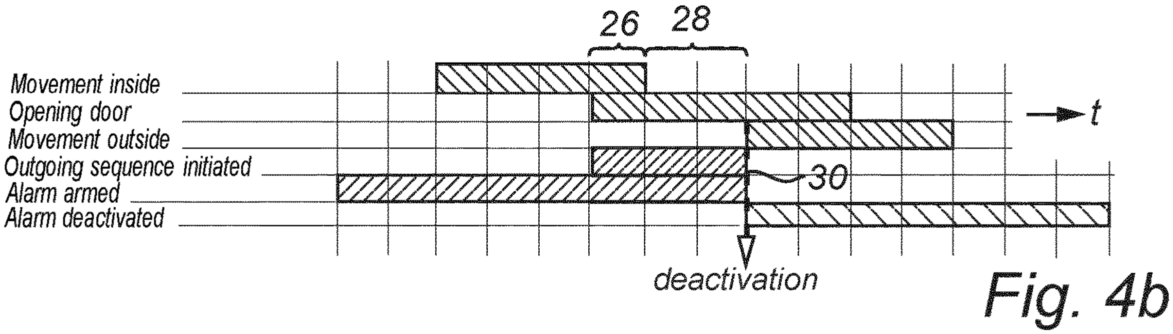

In a particular embodiment, the control unit 18 is configured to set a first status "movement inside" while the first detector 12 detects movement inside the home 100 and to set a second status "opening door" while the second detector 14 detects opening of the door 104, see FIG. 4*b*. The control unit 18 is further configured to set a third status "outgoing sequence initiated" while both the first and second statuses "movement inside" and "opening door" are set, see FIG. 4*b* at 26. Furthermore, the control unit 18 maintains the third status "outgoing sequence initiated" once it has been set while the second status "opening door" is set even if the first status "movement inside" is unset, see FIG. 4*b* at 28. Furthermore, the control unit 18 automatically deactivates the night security alarm system 10 when movement outside the home 100 is detected by the third detector 16 while the third status "outgoing sequence initiated" is set, see FIG. 4*b* at 30. In other words, the third status "outgoing sequence initiated" combined with a fourth status "movement outside" (set while the third detector 16 detects movement outside the home 100) confirms automatic deactivation of the night security alarm system 10.

Figure 4C:
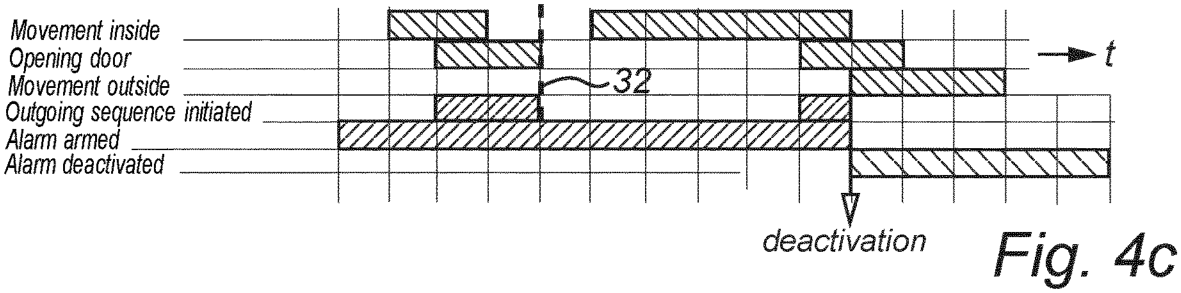

On the other hand, the control unit 18 resets the (set) third status "outgoing sequence initiated" when the second status "opening door" is unset, see FIG. 4*c* at 32, if for example the inhabitant goes back inside instead of going outside. Hence the aforementioned sequence a)-c) is cancelled, but may subsequently start over again, as also illustrated in FIG. 4*c*.

Figure 4D:
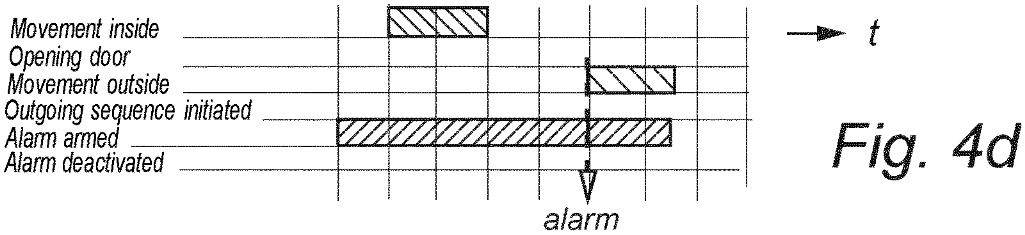
Figure 4E:
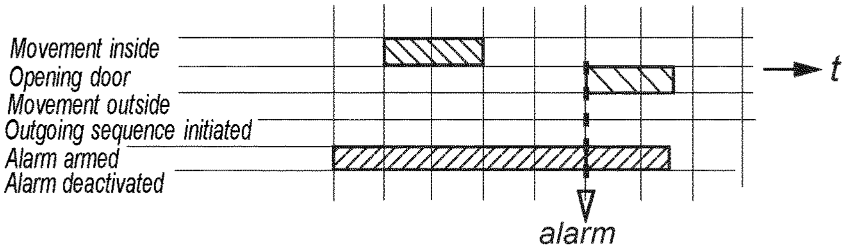
Figure 4F:
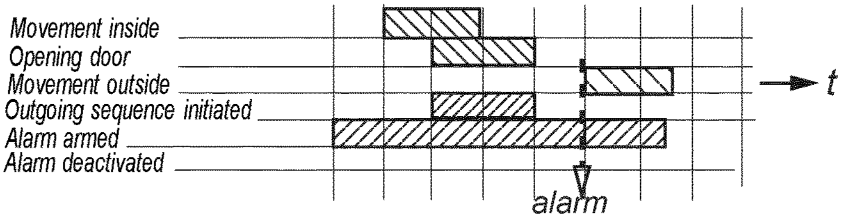

The control unit 18 is may further be configured to issue an alarm if the second detector 14 detects opening of the door 104 and/or the third detector 16 detects movement outside the home 100 while the third status "outgoing sequence initiated" is not set, as exemplified in FIGS. 4*d-f*.

In FIG. 4*d*, the first detector 12 first detects movement inside the home 100 and then the third detector 16 detects movement outside the home 100 without the second detector 14 detecting opening of the door 104 in the time in between (whereby the third status "outgoing sequence initiated" is not set), whereby an alarm is issued.

In FIG. 4*e*, the second detector 14 detects opening of the door 102 when the first status "movement inside" is not set (whereby the third status "outgoing sequence initiated" is not set), whereby an alarm is issued.

In FIG. 4*f*, the third detector 16 detects movement outside the home 100 after the third status "outgoing sequence initiated" has been reset, whereby an alarm is issued.

Figure 5:
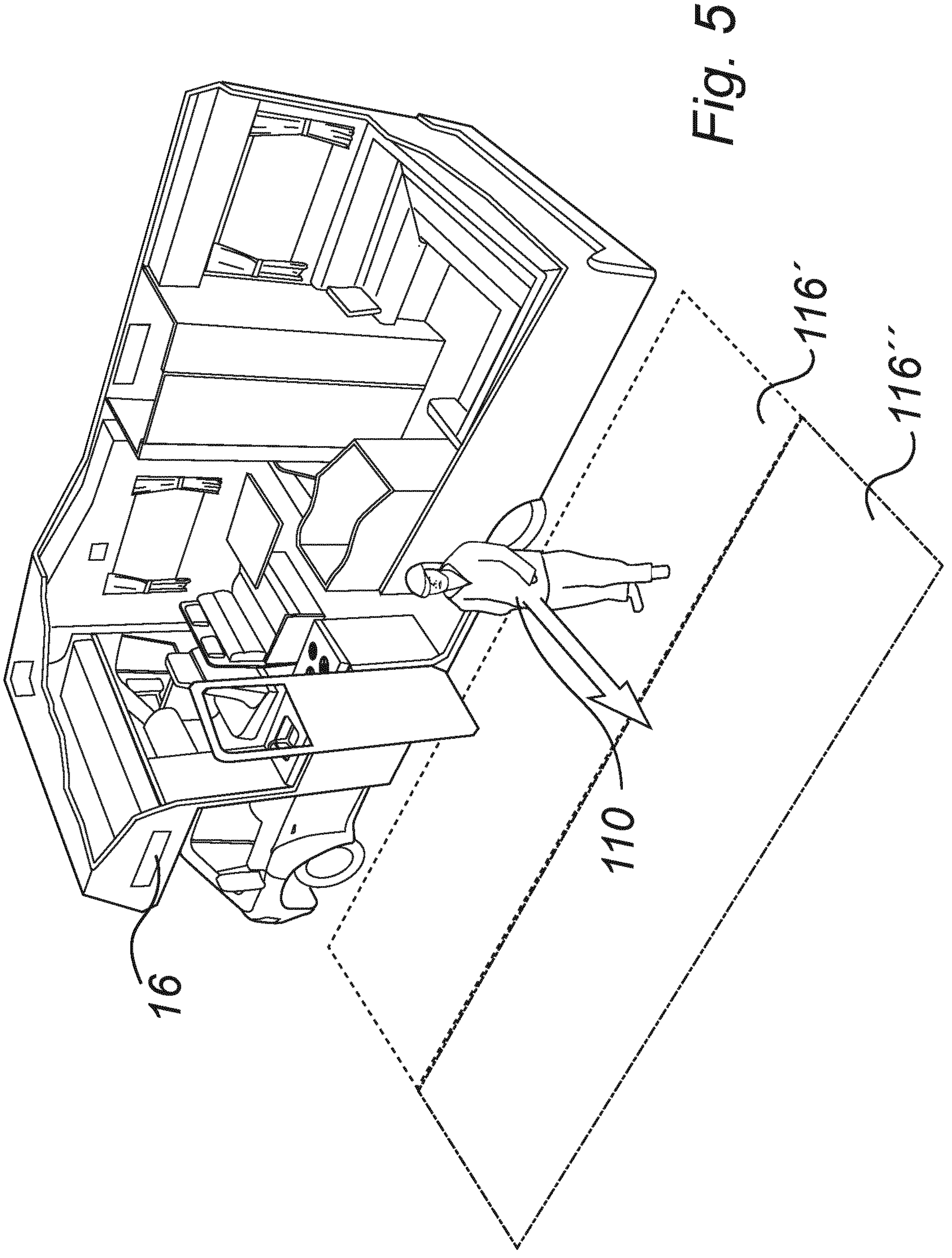
FIG. 5 illustrates a night security alarm system of a recreational vehicle according to another embodiment of the present invention.

In another embodiment illustrated in FIG. 5, the third detector 16 is adapted to selectively detect movement in a proximal zone 116' and a distal zone 116" of outside the home 110. Here, the control unit 18 is configured to automatically deactivate the night security alarm system 10 if the first detector 12 detects movement inside the home 100 and then the second detector 14 detects opening of the door 104 and then the third detector 16 detects movement first in the proximal zone 116' and then in the distal zone 116", but not if the third detector 16 detects movement first in the distal zone 116" and then in the proximal zone 116'.

The person skilled in the art realizes that the present invention by no means is limited to the embodiments described above. On the contrary, many modifications and variations are possible within the scope of the appended claims.

For example, the door (104) could alternatively be a driver's side door or a passenger's side door of the recreational vehicle.

Furthermore, the recreational vehicle or a caravan could be provided with a tent or the like forming part of the inside of the home, whereby the door (104) could be a door of the tent.

Furthermore, in case the home has multiple doors, like a recreational vehicle with an entrance door, a driver's side door, and a passenger's side door, the night security alarm system may comprise a second detector for each door.

Furthermore, the embodiment of FIG. 5 could be combined with any one of the embodiments of FIGS. 4*a-e*.

The invention claimed is:

1. A night security alarm system for a home, which night security alarm system comprises:

a first detector adapted to detect movement inside the home;

a second detector adapted to detect opening of a door connecting the inside and the outside of the home;

a third detector adapted to detect movement outside the home; and control unit configured to automatically deactivate the night security alarm system if the first detector detects movement inside the home and then the second detector detects opening of the door and then the third detector detects movement outside the home, wherein the control unit is configured to set a first status "movement inside" while the first detector detects movement inside the home, to set a second status "opening door" while the second detector detects opening of the door, and to set a third status "outgoing sequence initiated" while both the first and second statuses "movement inside" and "opening door" are set, wherein the control unit is configured to maintain the third status "outgoing sequence initiated" once it has been set while the second status "opening door" is set even if the first status "movement inside" is unset, wherein the control unit is configured to unset the third status "outgoing sequence initiated" when the second status "opening door" is unset, wherein the control unit is configured to automatically deactivate the night security alarm system when the third detector detects movement outside the home while the third status "outgoing sequence initiated" is set, and wherein the control unit is configured to issue an alarm if the second detector detects opening of the door and/or the third detector detects movement outside the home while the third status "outgoing sequence initiated" is not set.

2. A night security alarm system according to claim 1, wherein the second detector is a PIR-based detector adapted to detect opening of the door by detecting a person in or near the doorway of the door.

3. A night security alarm system according to claim 1, wherein the third detector is adapted to selectively detect movement in a proximal zone and a distal zone outside the home, and wherein the control unit is configured to automatically deactivate the night security alarm system if the first detector detects movement inside the home and then the second detector detects opening of the door and then the third detector detects movement first in the proximal zone and then in the distal zone outside the home.

4. A night security alarm system according to claim 1, wherein the first and third detectors are PIR-based motion detectors.

5. A recreational vehicle or caravan comprising a night security alarm system according to claim 1.

6. A method of operation of a night security alarm system of a home, which method comprises:

detecting, by a first detector of the night security alarm system, movement inside the home;

detecting, by a second detector of the night security alarm system, opening of a door connecting the inside and the outside of the home;

detecting, by a third detector of the night alarm system, movement outside the home; and by a control unit of the night security alarm system, automatically deactivating the night security alarm system if movement inside the home is detected and then opening of the door is detected and then movement outside the home is detected, wherein the control unit sets a first status "movement inside" while the first detector detects movement inside the home, sets a second status "opening door" while the second detector detects opening of the door, and sets a third status "outgoing sequence initiated" while both the first and second statuses "movement inside" and "opening door" are set, wherein the control unit maintains the third status "outgoing sequence initiated" once it has been set while the second status "opening door" is set even if the first status "movement inside" is unset, wherein the control unit unsets the third status "outgoing sequence initiated" when the second status "opening door" is unset, wherein the control unit automatically deactivates the night security alarm system when the third detector detects movement outside the home while the third status "outgoing sequence initiated" is set, and wherein the control unit issues an alarm if the second detector detects opening of the door and/or the third detector detects movement outside the home while the third status "outgoing sequence initiated" is not set.

7. A non-transitory computer program product comprising computer program code to perform, when executed on a computer, the step(s) of:

automatically deactivating a night security alarm system for a home if movement inside the home is detected by a first detector and then opening of a door connecting the inside and the outside of the home is detected by a second detector and then movement outside the home is detected by a third detector, wherein the computer sets a first status "movement inside" while the first detector detects movement inside the home, sets a second status "opening door" while the second detector detects opening of the door, and sets a third status "outgoing sequence initiated" while both the first and second statuses "movement inside" and "opening door" are set, wherein the computer maintains the third status "outgoing sequence initiated" once it has been set while the second status "opening door" is set even if the first status "movement inside" is unset, wherein the computer unsets the third status "outgoing sequence initiated" when the second status "opening door" is unset, and wherein the computer automatically deactivates the night security alarm system when the third detector detects movement outside the home while the third status "outgoing sequence initiated" is set, and issuing an alarm if the second detector detects opening of the door and/or the third detector detects movement outside the home while the third status "outgoing sequence initiated" is not set.

8. A non-transitory computer-readable storage medium comprising the computer program product according to claim 7.

9. A control unit comprising the non-transitory computer program product according to claim 7.

* * * * *